G. A. GREGG.
DUMPING-CAR.
No. 175,075.  Patented March 21, 1876.
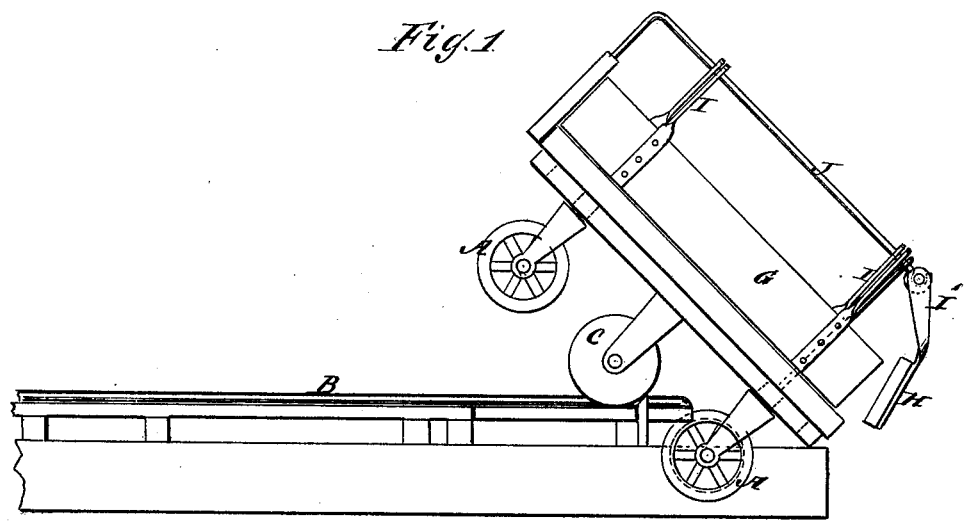
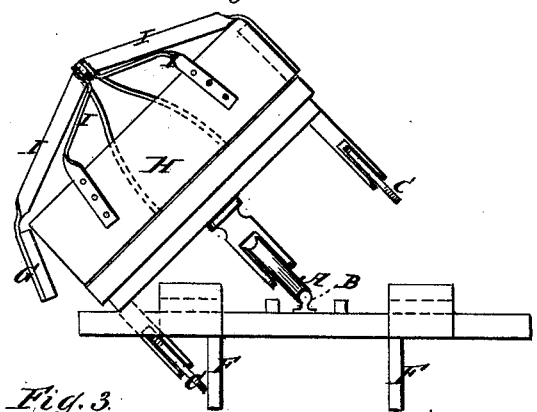
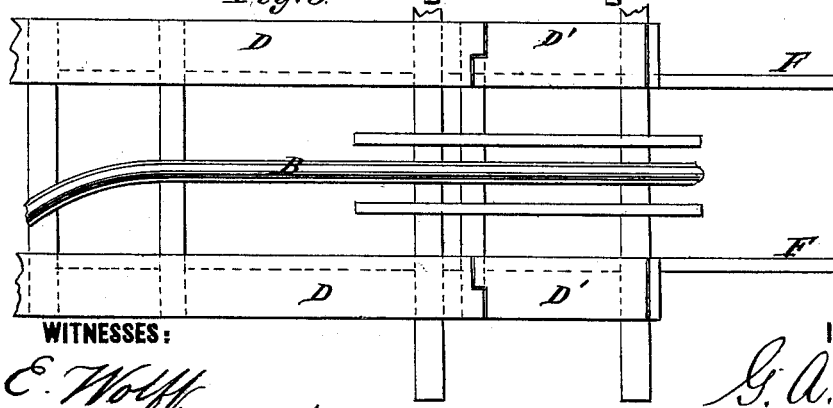
WITNESSES:
E. Wolff
Alex F. Roberts
INVENTOR:
G. A. Gregg
BY
ATTORNEYS.

UNITED STATES PATENT OFFICE.

GEORGE A. GREGG, OF QUARRY, IOWA.

IMPROVEMENT IN DUMPING-CARS.

Specification forming part of Letters Patent No. 175,075, dated March 21, 1876; application filed November 19, 1875.

*To all whom it may concern:*

Be it known that I, GEORGE A. GREGG, of Quarry, Marshall county, Iowa, have invented a new and Improved Dump-Car, of which the following is a specification:

The car is mounted on two grooved middle wheels running on the rails, and a single wheel on each side running on plank or any flat surface, by which contrivance the car may be dumped eiter sidewise or endwise, the middle wheels being the support when dumping sidewise, and the side wheels when dumping endwise.

The sides and end of the box are so pivoted to an overhead support, that they keep closed while the car is upright, and open self-actingly when the car dumps.

Figure 1 is a side section of my improved dump-car, showing the method of dumping endwise. Fig. 2 is an end elevation, showing the method of dumping sidewise; and Fig. 3 is a plan view of the track.

Similar letters of reference indicate corresponding parts.

A represents the middle grooved wheels, to run on the middle rail B, and C the side wheels to run on the level ways D, of plank or other material. The grooved wheels are located in the middle of the car longitudinally and balance it in that direction on the wheels C, and wheels C are located in the middle transversely, and balance the car in that direction on the wheels A. Wheels A are swiveled, so as to turn freely for running around curves.

To dump the car sidewise, one of the movable sections D' of the level ways is taken up, which allows the car to dump, as represented in Fig. 2, the side wheel C swinging down against the slide-rail F. To dump endwise, the front wheel is run off the end of the track, allowing the end of the car to swing down on the top of the rails A. The sides G and end H of the car are pivoted by the crooked rods I on the rod J, supported over the top of the car and along the center in such manner that they are kept closed by gravity when the car is upright, and swing open self-actingly when the car is tilted.

Having thus described my invention, I claim as new and desire to secure by Letters Patent—

1. The construction, with a dump-car having side wheels, of median guide-wheels journaled in swiveled bearings, as and for the purpose described.

2. The rod J, supported longitudinally over the middle of a dump-car, and provided with pivoted arms I, rigidly attached to swinging sides and ends, as and for the purpose specified.

GEORGE A. GREGG.

Witnesses:
J. L. CHIPMAN,
FRANK B. GARVIN.